United States Patent
Sato et al.

(10) Patent No.: US 9,783,083 B2
(45) Date of Patent: Oct. 10, 2017

(54) VEHICLE SEAT SLIDE DEVICE

(71) Applicant: Aisin Seiki Kabushiki Kaisha, Kariya (JP)

(72) Inventors: Takanori Sato, Kasugi (JP); Shogo Sakai, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/228,231

(22) Filed: Aug. 4, 2016

(65) Prior Publication Data

US 2017/0036567 A1    Feb. 9, 2017

(30) Foreign Application Priority Data

Aug. 6, 2015    (JP) .................. 2015-156504

(51) Int. Cl.
    *F16M 13/00*    (2006.01)
    *B60N 2/07*    (2006.01)
    *B60N 2/08*    (2006.01)

(52) U.S. Cl.
    CPC ......... *B60N 2/0725* (2013.01); *B60N 2/0705* (2013.01); *B60N 2/0715* (2013.01); *B60N 2/0722* (2013.01); *B60N 2/0806* (2013.01)

(58) Field of Classification Search
    USPC ....................................................... 248/429
    See application file for complete search history.

(56) References Cited

U.S. PATENT DOCUMENTS

| | | | | |
|---|---|---|---|---|
| 7,314,204 B2* | 1/2008 | Kohmura | ............... | B60N 2/073 248/430 |
| 8,469,328 B2* | 6/2013 | Nakamura | ........... | B60N 2/0705 248/424 |
| 8,939,424 B2* | 1/2015 | Fukuda | ............... | B60N 2/0705 248/424 |
| 9,162,588 B2* | 10/2015 | Yamada | ............... | B60N 2/0722 |
| 2007/0176072 A1* | 8/2007 | Ikegaya | ............... | B60N 2/0705 248/429 |
| 2013/0264454 A1* | 10/2013 | Hayashi | ............... | B60N 2/0705 248/429 |
| 2014/0042289 A1* | 2/2014 | Kawano | ............... | B60N 2/0818 248/429 |

(Continued)

FOREIGN PATENT DOCUMENTS

JP    2014-084008    5/2014

*Primary Examiner* — Monica Millner
(74) *Attorney, Agent, or Firm* — Oblon, McClelland, Maier & Neustadt, L.L.P.

(57) ABSTRACT

A vehicle seat slide device includes: a lower rail including a base portion fixed to a vehicle body and wall portions connected to ends of the base portion in a width direction; an upper rail supporting a seat and supported by the lower rail to be capable of sliding in an extending direction; and a foreign object blocking member disposed inside the lower rail and attached to the base portion, wherein first and second through holes are provided in positions at which the foreign object blocking member is attached in the base portion, the foreign object blocking member includes an attaching portion and a protruding portion protruding downward from an outside end portion, and the foreign object blocking member is elastically deformed such that the outside end portion is displaced downward.

7 Claims, 7 Drawing Sheets

(56) References Cited

U.S. PATENT DOCUMENTS

2015/0060626 A1\* 3/2015 Hayashi .............. B60N 2/0705
  248/429
2015/0090854 A1\* 4/2015 Hayashi .............. B60N 2/0705
  248/429

\* cited by examiner

VEHICLE SEAT SLIDE DEVICE

CROSS REFERENCE TO RELATED APPLICATIONS

This application is based on and claims priority under 35 U.S.C. §119 to Japanese Patent Application 2015-156504, filed on Aug. 6, 2015, the entire contents of which are incorporated herein by reference.

TECHNICAL FIELD

This disclosure relates to a vehicle seat slide device which supports a seat such that the seat is capable of sliding.

BACKGROUND DISCUSSION

JP 2014-84008A (Reference 1) discloses an example of a vehicle seat slide device which, by sliding an upper rail in a vehicle front-rear direction in relation to a lower rail which is fixed to a vehicle body, adjusts the position of a seat which is supported by the upper rail in the vehicle front-rear direction. The lower rail of the device includes a base portion which extends in the vehicle front-rear direction, and a pair of wall portions which are connected to end portions of the base portion in the vehicle width direction. A foreign object blocking member for suppressing the entrance of a foreign object such as a lighter into the lower rail from above is attached to the base portion of the lower rail.

In the device described in Reference 1, a snap-fit structure is adopted as the attachment structure of the foreign object blocking member to the lower rail. In other words, a through hole is formed in the base portion of the lower rail, and a protruding portion which protrudes downward is provided on the foreign object blocking member. When the through hole is penetrated by the protruding portion, a claw portion which is provided on the tip of the protruding portion is caused to abut against the bottom surface of the base portion, the bottom surface being positioned on the opposite side from the top surface which faces the foreign object blocking member. By locking the claw portion of the protruding portion with the lower rail, it is possible to attach the foreign object blocking member to the lower rail.

Incidentally, in the snap-fit structure described above, the length dimension of the protruding portion is larger than the thickness dimension of the base portion by a sufficient degree in order to cause the claw portion of the protruding portion to reliably abut against the bottom surface of the base portion of the lower rail. However, in this case, wobbling of the foreign object blocking member is permitted within a range in which the locking between the claw portion of the protruding portion and the lower rail is held. When the foreign object blocking member wobbles in relation to the lower rail, collision between the foreign object blocking member and the lower rail occurs repeatedly, and abnormal noise is generated as a result of the collision.

SUMMARY

Thus, a need exists for a vehicle seat slide device which is not suspectable to the drawback mentioned above.

A vehicle seat slide device according to an aspect of this disclosure includes a lower rail which includes a base portion which is fixed to a vehicle body and a pair of wall portions which are connected to both ends of the base portion in a width direction, an upper rail which supports a seat and is supported by the lower rail in a state of being capable of sliding in an extending direction of the lower rail, and a foreign object blocking member which is disposed inside the lower rail and is attached to the base portion, in which a first through hole and a second through hole which is disposed closer to an outside in the extending direction than the first through hole are provided in positions at which the foreign object blocking member is attached in the base portion of the lower rail, in which the foreign object blocking member includes an attaching portion which is disposed to pass through the first through hole and to be lower than the base portion, and a protruding portion which protrudes downward from an outside end portion which is an end portion of an outside in the extending direction, passes through the second through hole of the base portion, and a claw portion provided on a tip of the protruding portion is pressed against a bottom surface of the base portion, and in which the foreign object blocking member is elastically deformed such that the outside end portion is displaced downward in a state in which the foreign object blocking member is attached to the lower rail.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, description will be given of an embodiment of a vehicle seat slide device according to FIGS. 1 to 12.

Figure 1:
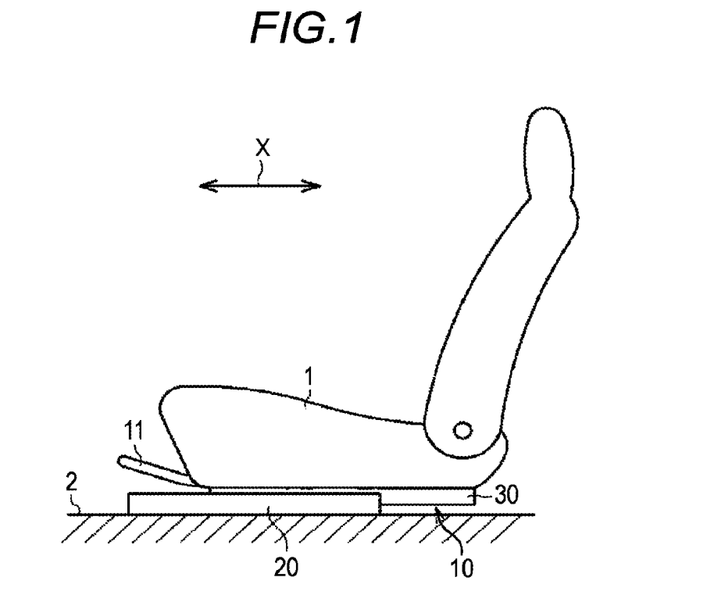
FIG. 1 is a side surface view schematically illustrating an embodiment of a vehicle seat slide device, and a seat which is supported by the vehicle seat slide device.

FIG. 1 illustrates a vehicle seat slide device 10 of the embodiment, and a seat 1 which is supported by the vehicle seat slide device 10. As illustrated in FIG. 1, it becomes possible to slide the seat 1 in a vehicle front-rear direction X by operating a release handle 11.

Figure 3:
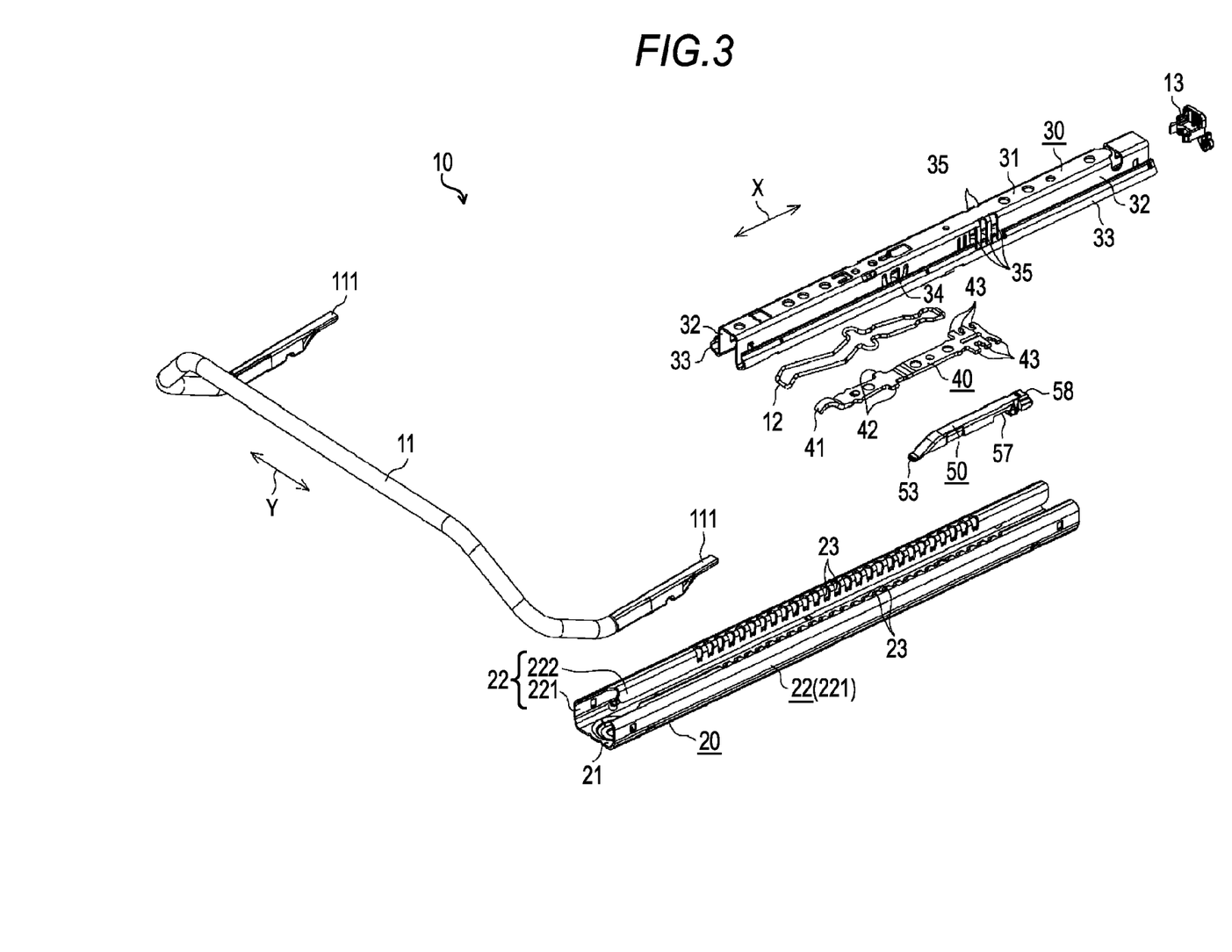
FIG. 3 is an exploded perspective diagram illustrating a portion of the components of the vehicle seat slide device.

As illustrated in FIGS. 1 and 3, the vehicle seat slide device 10 is provided with a pair of lower rails 20 which are disposed on both sides in a vehicle width direction Y, and a pair of upper rails 30 which are supported in a state of being capable of sliding in the vehicle front-rear direction X in relation to the lower rails 20. The pair of lower rails 20 are fixed to a floor 2 of the vehicle which forms the vehicle body, and the pair of upper rails 30 support the seat 1.

Figure 2:
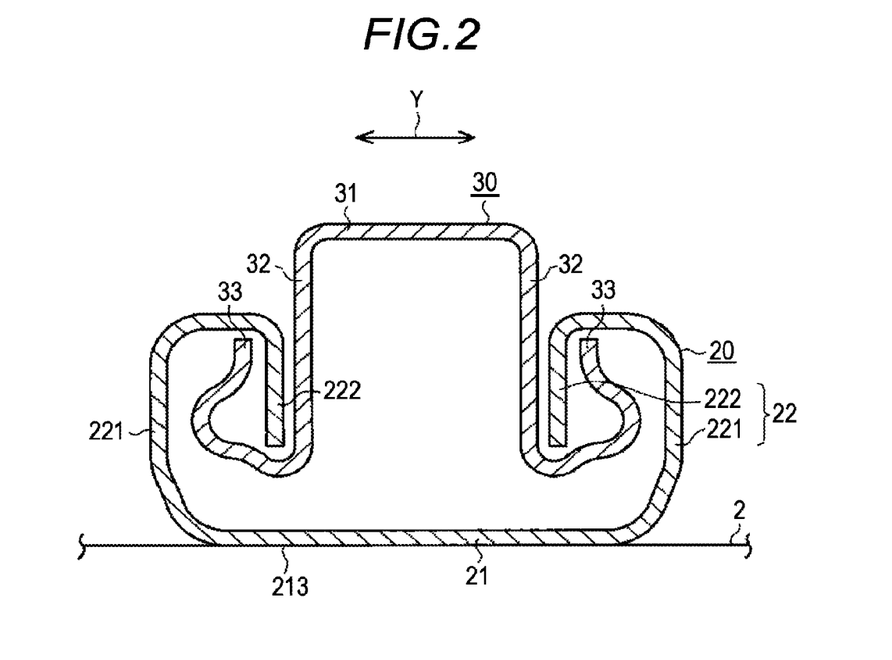
FIG. 2 is a sectional diagram illustrating a lower rail and an upper rail in the vehicle seat slide device.

As illustrated in FIGS. 2 and 3, the lower rail 20 is formed to have a cross section which is open upward and is substantially U-shaped by machining a plate material. Specifically, the lower rail 20 includes a base portion 21 which extends in the vehicle front-rear direction X and is fixed to the floor 2 of the vehicle, and a pair of wall portions 22 which are connected to both sides of the base portion 21 in the vehicle width direction Y. The base portion 21 is fixed to the floor 2 by using a fastening tool such as a bolt. A lower side wall portion 221 and a lower side fold-in wall portion 222 are provided in the wall portion 22. The lower side wall portion 221 extends upward from an end portion of the base portion 21 in the vehicle width direction Y, and the lower side fold-in wall portion 222 is positioned closer to the inside in the vehicle width direction Y than the lower side wall portion 221. A gap interposes between the lower side wall portion 221 and the lower side fold-in wall portion 222.

A plurality of lock holes 23 are formed along the vehicle front-rear direction X in the lower side fold-in wall portion 222 of the lower rail 20. Of the lock holes 23, a length from the lock hole 23 positioned closest to the front side to the lock hole 23 positioned closest to the rear side corresponds to a maximum value of the movement amount permitted by the upper rail 30 and the seat 1.

The upper rail 30 is formed to have a cross section which is open downward and is substantially U-shaped by machining a plate material. Specifically, the upper rail 30 extends in the vehicle front-rear direction X. The upper rail 30 includes a main body portion 31, a pair of upper side wall portions 32, and a pair of upper side fold-in wall portions 33. The main body portion 31 faces the base portion 21 of the lower rail 20 interposing a space therebetween, the pair of upper side wall portions 32 are connected to both sides of the main body portion 31 in the vehicle width direction Y, and the pair of upper side fold-in wall portions 33 are positioned further outside in the vehicle width direction Y than the upper side wall portions 32. Both of the upper side wall portions 32 are disposed further inside in the vehicle width direction Y than the lower side fold-in wall portions 222 of the lower rail 20, and both of the upper side fold-in wall portions 33 are disposed between the lower side wall portion 221 and the lower side fold-in wall portion 222 of the lower rail 20 in the vehicle width direction Y. A cap member 13 is attached to the vehicle rear end of the upper rail 30.

Shaft accommodating holes 34 are formed in the upper side wall portion 32 of the upper rail 30 at a position slightly closer to the front of the vehicle than the center in the vehicle front-rear direction X. A plurality of (in FIG. 3, three) locking holes 35 are formed in the upper side wall portion 32 at a position closer to the center in the vehicle front-rear direction X than the shaft accommodating holes 34. The interval between the locking holes 35 which are lined up in the vehicle front-rear direction X is the same as the interval in the vehicle front-rear direction X between the lock holes 23 which are provided in the lower side fold-in wall portion 222 of the lower rail 20.

As illustrated in FIG. 3, the vehicle seat slide device 10 is provided with a locking member 40 and a spring 12 which are supported by the upper rail 30. The locking member 40 is a long member which extends in the vehicle front-rear direction X. In a case in which the front end of the locking member 40 in the vehicle front-rear direction is a front end portion 41 of the locking member 40, the front end portion 41 is positioned directly under a tip portion 111 of the release handle 11. Rotating shaft portions 42 which protrude to the outside in the vehicle width direction Y are provided in a middle position of the locking member 40 in the vehicle front-rear direction X, the rotating shaft portions 42 are inserted into the shaft accommodating holes 34 which are provided in the upper side wall portion 32 of the upper rail 30. Accordingly, the locking member 40 rotates freely in relation to the upper rail 30.

Locking tabs 43 which protrude to the outside in the vehicle width direction Y are provided on the rear end of the locking member 40 in the vehicle front-rear direction X. The locking tabs 43 are capable of entering the lock holes 23 which are provided in the wall portion 22 of the lower rail 20, and the locking holes 35 which are provided in the upper side wall portion 32 of the upper rail 30.

The spring 12 is positioned above the locking member 40. The spring 12 applies a biasing force to the locking member 40 in a direction which displaces the rear end in the vehicle front-rear direction X downward. Therefore, in a case in which the release handle 11 is not being operated, the locking tabs 43 of the locking member 40 enter the lock holes 23 which are provided in the wall portion 22 of the lower rail 20. In this case, the locking tabs 43 of the locking member 40 are locked into the lower rail 20, and the sliding of the upper rail 30 relative to the lower rail 20 is restricted.

Meanwhile, when the release handle 11 is operated, the tip portion 111 of the release handle 11 is displaced downward, and the front end portion 41 of the locking member 40 is pushed downward by the release handle 11. Therefore, the locking member 40 rotates against the biasing force from the spring 12, and the locking tabs 43 of the locking member 40 are displaced upward. As a result, the locking tabs 43 are released from the lock holes 23 of the lower rail 20, and the locking between the locking tabs 43 and the lower rail 20 is released. Accordingly, the upper rail 30 becomes capable of sliding relative to the lower rail 20.

Figure 4:
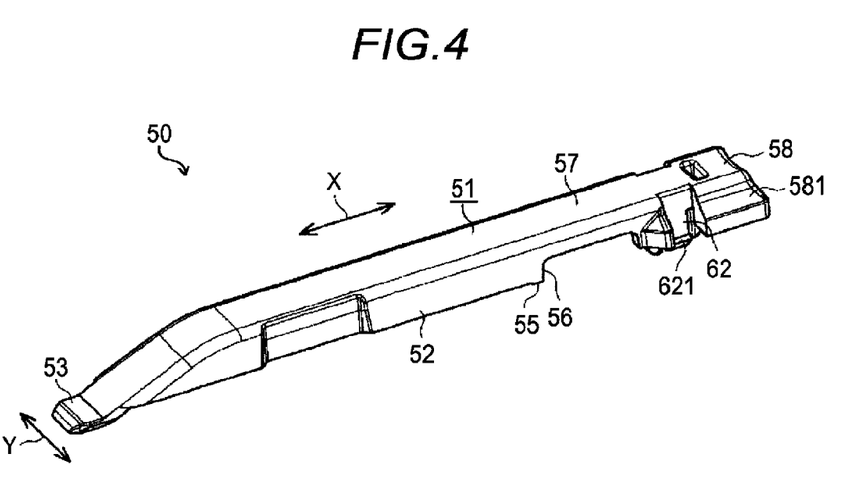
FIG. 4 is a perspective diagram illustrating a foreign object blocking member in the vehicle seat slide device.

As illustrated in FIGS. 3 and 4, a foreign object blocking member 50 for suppressing the entrance of a foreign object such as a lighter into the lower rail 20 from above is provided in an attachment position of the vehicle rear side in the lower rail 20. The foreign object blocking member 50 is positioned closer to the inside of the lower rail 20 in the vehicle width direction Y than both of the lower side fold-in wall portions 222, and is attached to the base portion 21 of the lower rail 20.

Figure 5:
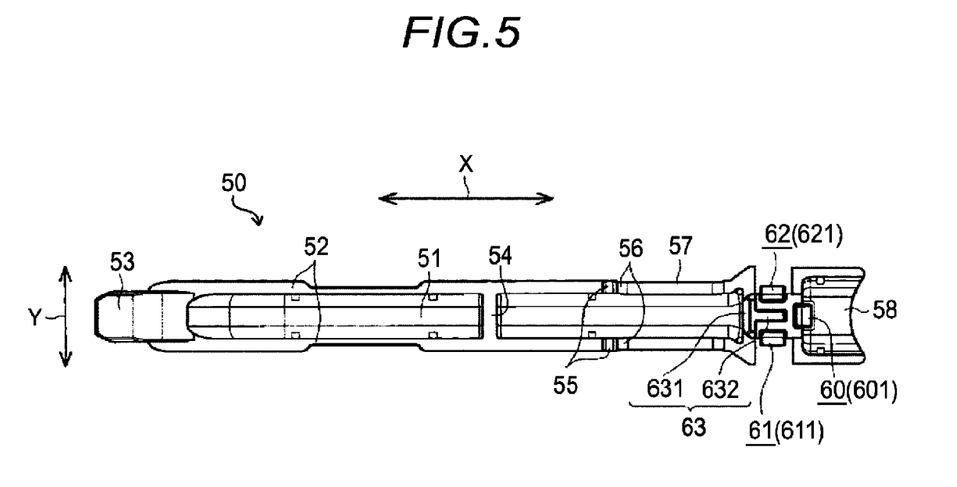
FIG. 5 is a rear surface view illustrating the foreign object blocking member in the vehicle seat slide device.

As illustrated in FIG. 4, the foreign object blocking member 50 is formed of a synthetic resin, and includes a main body portion 51 and a pair of blocking wall portions 52. The main body portion 51 extends in the vehicle front-rear direction X, and the blocking wall portions 52 extend downward from both sides of the main body portion 51 in the vehicle width direction Y. A vehicle front part of the main body portion 51 of the foreign object blocking member 50 is inclined so as to be positioned lower as the front of the vehicle is approached. An attaching portion 53 which protrudes to the vehicle front is provided on the front end of the foreign object blocking member 50. As illustrated in FIG. 5, a reinforcing rib 54 which joins the pair of blocking wall portions 52 is provided at a middle position of the foreign object blocking member 50 in the vehicle front-rear direction X.

Figure 6:
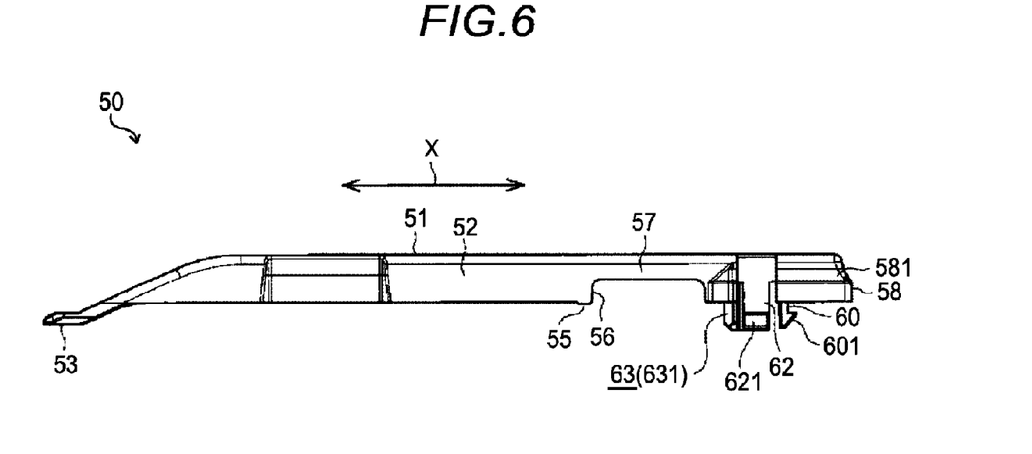
FIG. 6 is a side surface view illustrating the foreign object blocking member in the vehicle seat slide device.

As illustrated in FIGS. 5 and 6, small protrusions 55 which protrude downward are provided on the vehicle rear side of the reinforcing rib 54 at the tips (that is, the bottom ends) of the pair of blocking wall portions 52. The tips of the protrusions 55 are positioned higher than the attaching portion 53 described above. Recessed portions 56 which are open downward are provided closer to the vehicle rear than the protrusions 55 in the pair of blocking wall portions 52. By providing the recessed portions 56 in the blocking wall portions 52 in this manner, the corresponding parts of the foreign object blocking member 50 are fragile portions 57 which have a lower rigidity than the other parts. The fragile portions 57 warp more easily than the other parts.

Figure 7:
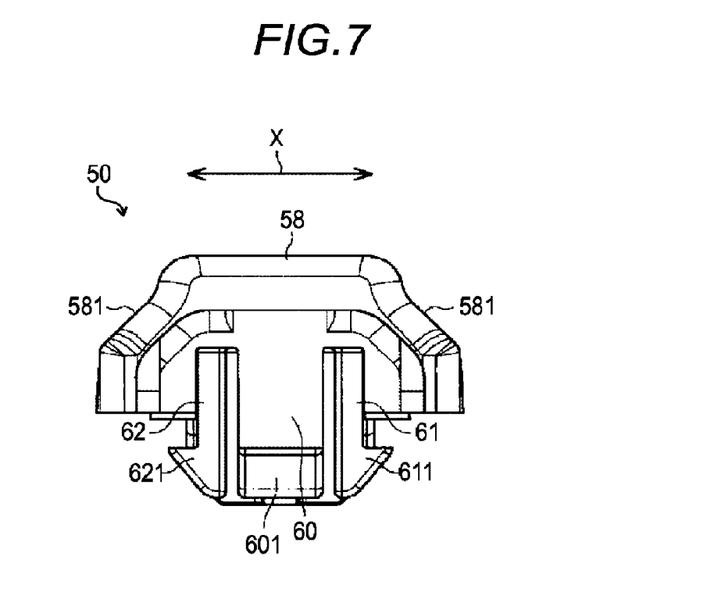
FIG. 7 is a plan view of the foreign object blocking member in the vehicle seat slide device as viewed from a vehicle rear side.

As illustrated in FIGS. 5 and 7, the length in the vehicle width direction Y of a rear end portion 58 which is closer to the vehicle rear than the fragile portions 57 in the foreign object blocking member 50 is greater than the length in the vehicle width direction Y of the other parts. In the embodiment, since the attachment position described above is set on the vehicle rear portion of the lower rail 20, the rear end portion 58 corresponds to "an outside end portion" which is an end portion of the outside in the vehicle front-rear direction X which is the extending direction of the lower rail 20. Inclined surfaces 581 are provided on both sides of the rear end portion 58 in the vehicle width direction Y. The inclined surfaces 581 are inclined to be positioned further outside in the vehicle width direction Y the closer to the bottom. In other words, the rear end portion 58 is configured such that the length in the vehicle width direction Y increases the lower the part.

As illustrated in FIG. 5, three protruding portions 60, 61, and 62 are provided on the rear end portion 58 of the foreign object blocking member 50. In other words, the outside protruding portion 60 which protrudes downward from the center in the vehicle width direction Y, and the pair of lateral protruding portions 61 and 62 which are closer to the vehicle front than the outside protruding portion 60 and protrude downward from positions which are on the outside in the vehicle width direction Y are provided on the rear end portion 58. A claw portion 601 which protrudes to the vehicle rear is provided on the tip (that is, the bottom end in the drawing) of the outside protruding portion 60. Of the pair of lateral protruding portions 61 and 62, a claw portion 611 which protrudes to one side in the vehicle width direction Y is provided on the tip of the first lateral protruding portion 61 which is disposed on the one side in the vehicle width direction Y, and a claw portion 621 which protrudes to the other side in the vehicle width direction Y is provided on the tip of the second lateral protruding portion 62 which is disposed on the other side in the vehicle width direction Y.

The tips (that is, the claw portions 601, 611, and 621) of the protruding portions 60 to 62 are positioned lower than the tips of the protrusions 55.

As illustrated in FIG. 5, a displacement restriction portion 63, which has a higher rigidity than the outside protruding portion 60, is provided closer to the vehicle front than the outside protruding portion 60 in the rear end portion 58 of the foreign object blocking member 50. The displacement restriction portion 63 includes a displacement restriction wall portion 631 and a reinforcing wall portion 632. The displacement restriction wall portion 631 protrudes downward from the part closer to the vehicle front than the pair of lateral protruding portions 61 and 62, and the reinforcing wall portion 632 is connected to the center of the displacement restriction wall portion 631 in the vehicle width direction Y.

Figure 8:
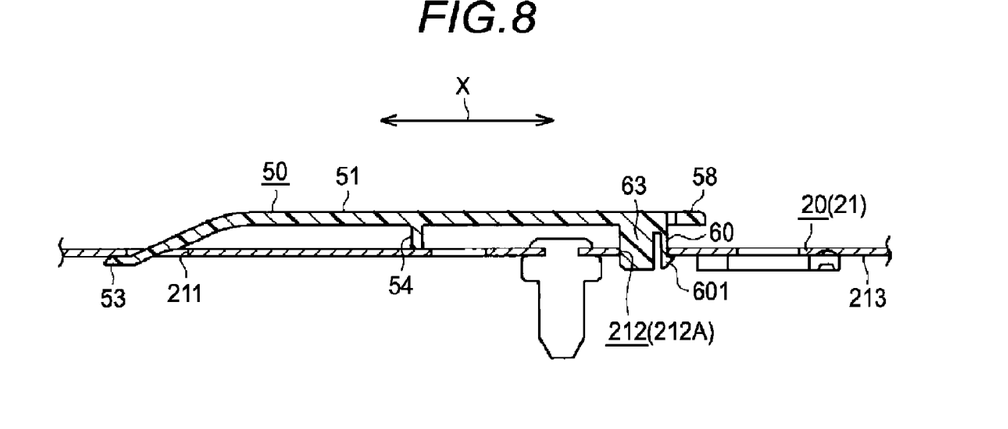
FIG. 8 is a sectional diagram illustrating part of a base portion of the lower rail to which the foreign object blocking member is attached and the periphery thereof in the vehicle seat slide device.

As illustrated in FIG. 8, a first through hole 211 and a second through hole 212 which is positioned closer to the vehicle rear than the first through hole 211 are provided at the attachment position of the base portion 21 of the lower rail 20. In a state in which the foreign object blocking member 50 is attached to the lower rail 20, the attaching portion 53 of the foreign object blocking member 50 passes through the first through hole 211 and is hooked onto a part of a bottom surface 213 of the base portion 21 of the lower rail 20, the part being closer to the vehicle front than the first through hole 211.

Meanwhile, the protruding portions 60 to 62 and the displacement restriction portion 63 which are provided on the rear end portion 58 of the foreign object blocking member 50 penetrate the second through hole 212. At this time, the displacement restriction wall portion 631 of the displacement restriction portion 63 abuts against a part close to the front of the vehicle of a circumferential surface 212A which surrounds the second through hole 212 of the base portion 21 of the lower rail 20. The claw portion 601 of the outside protruding portion 60 is pressed against a part which is closer to the vehicle rear than the second through hole 212 in the bottom surface 213 of the base portion 21. The first lateral protruding portion 61 is pressed against a part which is closer to the one side in the vehicle width direction Y than the second through hole 212 in the bottom surface 213 of the base portion 21, and the second lateral protruding portion 62 is pressed against a part which is closer to the other side in the vehicle width direction Y than the second through hole 212 in the bottom surface 213.

Figure 11:
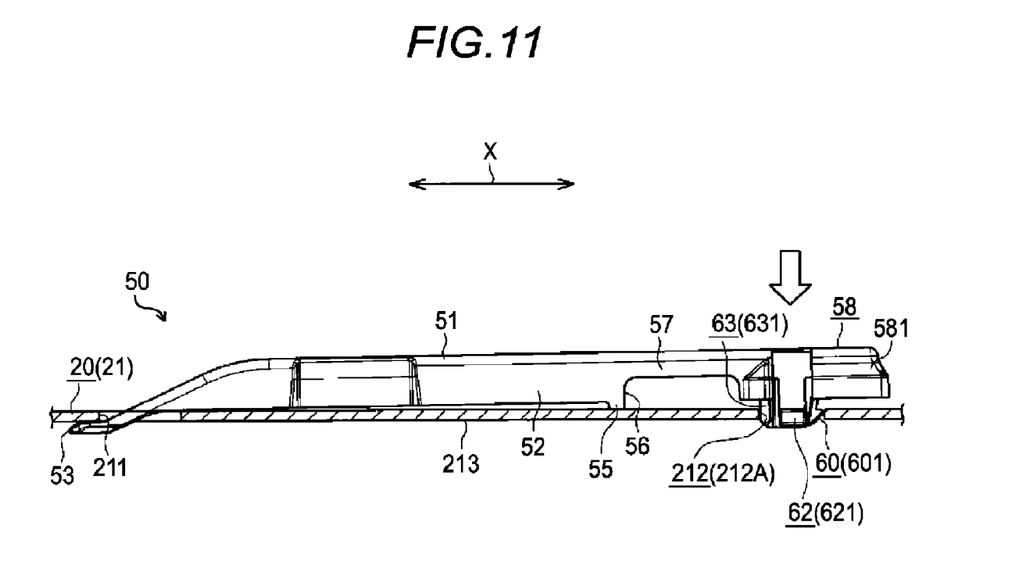
FIG. 11 is a sectional diagram illustrating a state in which the foreign object blocking member is being attached to the lower rail in the vehicle seat slide device.
Figure 12:
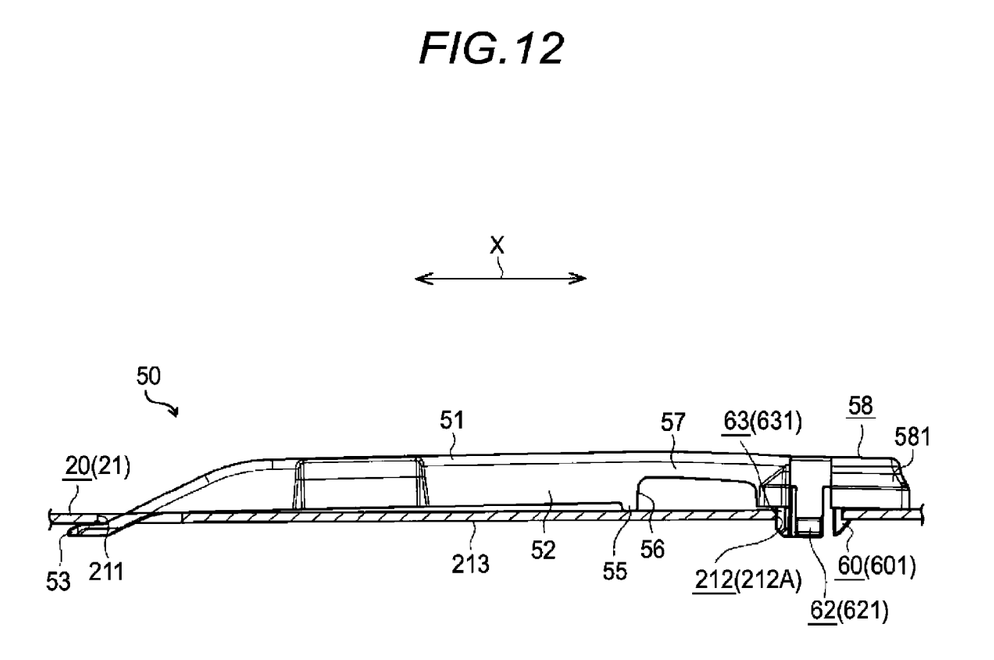
FIG. 12 is a sectional diagram illustrating a state in which the foreign object blocking member is attached to the lower rail in the vehicle seat slide device.

Next, description will be given of the procedure carried out when attaching the foreign object blocking member 50 to the lower rail 20, with reference to FIGS. 9 to 12. FIGS. 11 and 12 depict an exaggerated size of the protrusion 55, and FIG. 12 depicts an exaggerated warping of the fragile portion 57.

Figure 9:
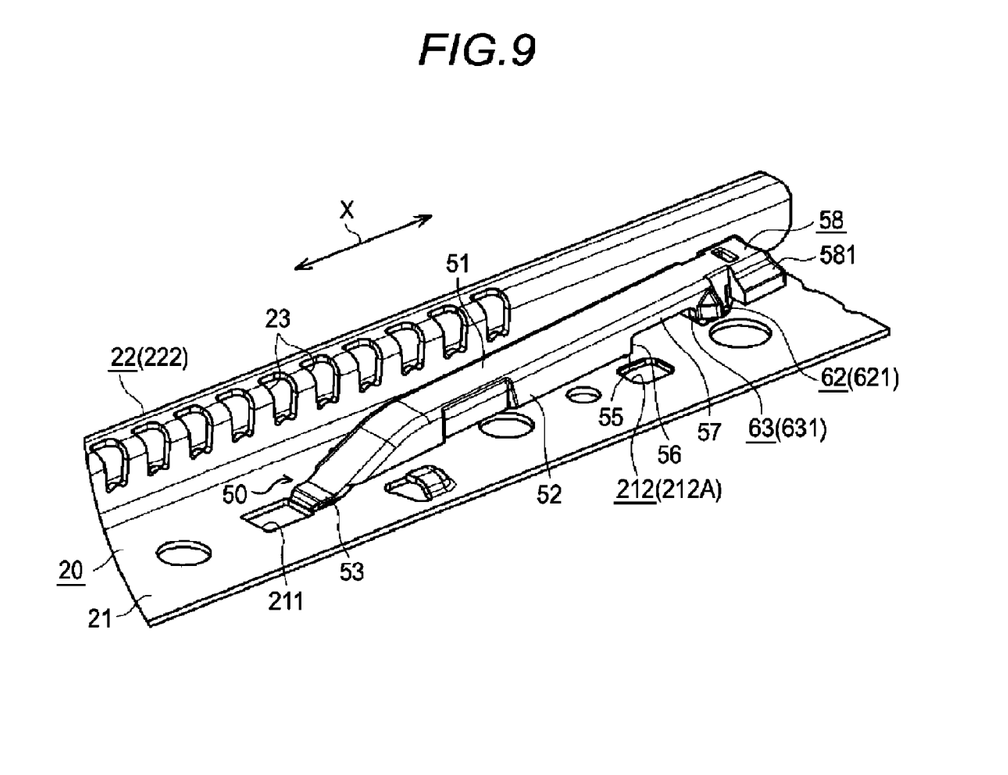
FIG. 9 is a perspective diagram illustrating a state in which the foreign object blocking member is to be attached to the lower rail in the vehicle seat slide device.
Figure 10:
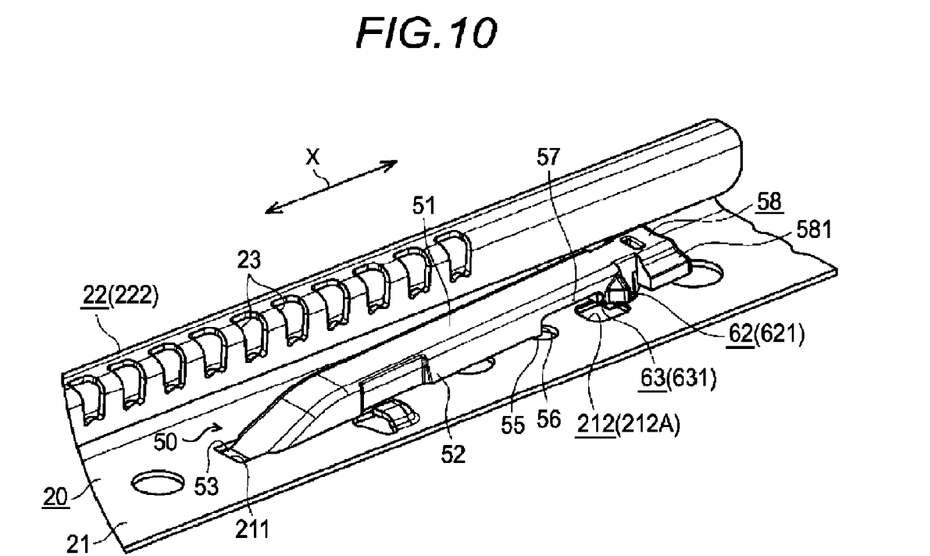
FIG. 10 is a perspective diagram illustrating a state in which the foreign object blocking member is being attached to the lower rail in the vehicle seat slide device.

As illustrated in FIGS. 9 and 10, the attaching portion 53 of the foreign object blocking member 50 is inserted into the first through hole 211 of the lower rail 20. The protruding portions 60 to 62 and the displacement restriction portion 63 are caused to penetrate the second through hole 212 in a state in which the attaching portion 53 is hooked onto the bottom surface 213 of the base portion 21 of the lower rail 20.

At this time, as illustrated in FIG. 11, while the tip of the protrusion 55 of the foreign object blocking member 50 abuts against the base portion 21, the protruding portions 60 to 62 and the displacement restriction portion 63 do not penetrate the second through hole 212. In other words, in a situation in which the fragile portions 57 are not elastically deformed, the end surfaces of the claw portions 601, 611, and 621 of the protruding portions 60 to 62 are positioned above the bottom surface 213 of the base portion 21 of the lower rail 20, and the claw portions 601, 611, and 621 are not locked into the lower rail 20. In this state, when the rear end portion 58 of the foreign object blocking member 50 is pushed downward, the fragile portions 57 of the foreign object blocking member 50 elastically deform such that the rear end portion 58 is displaced downward.

Therefore, as illustrated in FIG. 12, the protruding portions 60 to 62 and the displacement restriction portion 63 penetrate the second through hole 212, and the claw portions 601, 611, and 621 of the protruding portions 60 to 62 contact the bottom surface 213 of the base portion 21. At this time, the rear end portion 58 of the foreign object blocking member 50 has a tendency to be displaced upward due to the restorative force of the fragile portions 57 which are elastically deformed. Therefore, the claw portions 601, 611, and 621 of the protruding portions 60 to 62 are pressed against the bottom surface 213 of the base portion 21.

Next, description will be given of the actions of the vehicle seat slide device 10 of the embodiment.

In a state in which the foreign object blocking member 50 is attached to the lower rail 20, the fragile portions 57 are deformed elastically, and the claw portions 601, 611, and 621 of the protruding portions 60 to 62 which are provided on the rear end portion 58 of the foreign object blocking member 50 are pressed against the bottom surface 213 of the base portion 21 of the lower rail 20 due to the restorative force of the fragile portions 57. As a result, the wobbling of the foreign object blocking member 50 in relation to the lower rail 20 is suppressed.

At this time, in the foreign object blocking member 50, since the rear end portion 58 is displaced downward, the foreign object blocking member 50 has a tendency to rotate in a direction which displaces the attaching portion 53 upward using the tips of the protrusions 55 as a fulcrum. Therefore, the attaching portion 53 which is positioned lower than the base portion 21 of the lower rail 20 is pushed into the bottom surface 213 of the base portion 21. Therefore, the wobbling between the attaching portion 53 and a part of the lower rail 20 which contacts the attaching portion 53 is suppressed.

In a situation in which a foreign object such as a lighter enters between the foreign object blocking member 50 and the vehicle rear end of the upper rail 30 in the lower rail 20, when the upper rail 30 slides in the vehicle front-rear direction, the foreign object is pushed to the vehicle rear by the cap member 13 which is attached to the upper rail 30. The foreign object is moved over the foreign object blocking member 50 by the upper rail 30 and is discharged to the outside of the lower rail 20.

According to the configurations and actions described above, it is possible to obtain the following effects.

(1) In the embodiment, the foreign object blocking member 50 is attached to the lower rail 20 in an elastically deformed state. Therefore, even in a case in which a snap-fit structure is adopted as the attachment structure, the claw portions 601, 611, and 621 of the protruding portions 60 to 62 are capable of maintaining a state of being pressed against the bottom surface 213 of the base portion 21 of the lower rail 20. As a result, by suppressing the wobbling of the foreign object blocking member 50 in relation to the lower rail 20, it is possible to suppress the generation of abnormal noise in the attachment parts of the foreign object blocking member 50 to the lower rail 20.

(2) In the embodiment, the fragile portions 57 which are closer to the vehicle rear than the protrusions 55 in the foreign object blocking member 50 are elastically deformed. By elastically deforming the parts which are close to the protruding portions 60 to 62, it is possible to increase the force pressing the claw portions 601, 611, and 621 of the protruding portions 60 to 62 into the base portion 21 of the lower rail 20. By increasing the force with which the claw portions 601, 611, and 621 are pressed against the bottom surface 213 of the base portion 21 of the lower rail 20, it becomes easier to maintain the state in which the claw portions 601, 611, and 621 are pressed against the bottom surface 213 of the base portion 21 of the lower rail 20, and it is possible to favorably suppress the wobbling of the foreign object blocking member 50 in relation to the lower rail 20.

(3) In the embodiment, the foreign object blocking member 50 is provided with the fragile portions 57 which are closer to the vehicle rear than the protrusions 55, and the fragile portions 57 are caused to elastically deform. Therefore, it is possible to facilitate the elastic deformation of the foreign object blocking member 50 in comparison with a case in which a fragile portion is not provided in the foreign object blocking member 50.

(4) In the embodiment, the fragile portions 57 are configured by forming the recessed portions 56 which are open downward in a portion of the blocking wall portions 52 of the foreign object blocking member 50. Therefore, it is possible to facilitate the elastic deformation of the fragile portions 57 in a direction in which the rear end portion 58 is displaced downward.

(5) In a state in which the foreign object blocking member 50 is attached to the lower rail 20, the foreign object blocking member 50 has a tendency to rotate using the tips of the protrusions 55 as a fulcrum. Therefore, it is possible to push the attaching portion 53 of the foreign object blocking member 50 into the bottom surface 213 of the base portion 21 of the lower rail 20, and it is possible to favorably exhibit an effect of suppressing the wobbling of the foreign object blocking member 50 in relation to the lower rail 20.

(6) The displacement restriction portion 63 which is provided on the rear end portion 58 of the foreign object blocking member 50 abuts against the part of the vehicle front in the circumferential surface 212A which surrounds the second through hole 212. Therefore, even if an external force to the vehicle front is applied to the rear end portion 58 of the foreign object blocking member 50, the displacement of the rear end portion 58 to the vehicle front is restricted by the difficulty of elastically deforming the displacement restriction portion 63. As a result, it becomes difficult to release the locking between the claw portion 601 of the outside protruding portion 60 and the lower rail 20. Therefore, even if the external force described above is applied to the rear end portion 58 of the foreign object blocking member 50, it is possible to maintain the state in which the foreign object blocking member 50 is attached to the lower rail 20.

(7) The lateral protruding portions 61 and 62 are provided on the rear end portion 58 of the foreign object blocking member 50. Therefore, even if an external force toward the vehicle front is applied to the rear end portion 58, and the locking between the claw portion 601 of the outside protruding portion 60 and the lower rail 20 is released, the locking between the claw portions 611 and 621 of both of the lateral protruding portions 61 and 62 and the lower rail 20 is maintained. Therefore, it is possible to maintain the state in which the foreign object blocking member 50 is attached to the lower rail 20.

(8) A gap is formed between the lower side fold-in wall portion 222 of the lower rail 20 and the rear end portion 58 of the foreign object blocking member 50. When a foreign object such as the tip of an umbrella enters the gap and an external force toward the inside in the vehicle width direction Y is applied to the lateral protruding portions 61 and 62 from the foreign object, there is a concern that the lateral protruding portions 61 and 62 elastically deform inwardly in the vehicle width direction Y and the locking between the claw portions 611 and 621 of the lateral protruding portions 61 and 62 and the lower rail 20 will be released. To deal with this point, in the embodiment, since the length in the vehicle width direction Y of the rear end portion 58 of the foreign object blocking member 50 is greater than that of the other parts, it becomes difficult for the foreign object to enter the gap due to the narrowing of the gap between the lower side fold-in wall portion 222 and the rear end portion 58. Therefore, it is possible to ensure that it is difficult to release the locking between the claw portions 611 and 621 of the lateral protruding portions 61 and 62 and the lower rail 20 due to it being difficult to apply an external force toward the inside in the vehicle width direction Y to the lateral protruding portions 61 and 62.

(9) Even if a foreign object such as the tip of an umbrella enters the space between the lower side fold-in wall portion 222 of the lower rail 20 and the rear end portion 58 of the foreign object blocking member 50, the foreign object contacts the inclined surfaces 581 of the rear end portion 58. Therefore, even if an external force is applied to the inclined surfaces 581 from the foreign object, an event in which the lateral protruding portions 61 and 62 elastically deform inwardly in the vehicle width direction Y due to the external force does not occur easily. Therefore, it is possible to ensure that it is difficult to release the locking between the claw portions 611 and 621 of the lateral protruding portions 61 and 62 and the lower rail 20.

The embodiment described above may also be modified as follows.

In the embodiment described, the inclined surfaces 581 are provided on both sides in the vehicle width direction Y of the rear end portion 58 of the foreign object blocking member 50. However, the configuration is not limited thereto, as long as it is possible to render the length of the rear end portion 58 in the vehicle width direction Y greater than that of the other portions, a configuration may be adopted in which the inclined surface 581 is provided on only one of both sides of the rear end portion 58 in the vehicle width direction Y, and a configuration may be adopted in which the rear end portion 58 is not provided with the inclined surface 581.

The length of the rear end portion 58 of the foreign object blocking member 50 in the vehicle width direction Y may be the same length as the other parts.

Even if an external force toward the vehicle front or the vehicle rear is applied to the foreign object blocking member 50, as long as the locking between the claw portion 601 of the outside protruding portion 60 and the lower rail 20 is not released, the lateral protruding portions 61 and 62 may not be provided on the rear end portion 58 of the foreign object blocking member 50.

Even if an external force toward the one side or an external force toward the other side in the vehicle width direction Y is applied to the rear end portion 58 of the foreign object blocking member 50, as long as the locking between the claw portions 611 and 621 of the lateral protruding portions 61 and 62 and the lower rail 20 is not released, the outside protruding portion 60 may not be provided on the rear end portion 58.

In the embodiment, the fragile portions 57 are formed by providing the recessed portions 56 on a portion of the blocking wall portions 52 of the foreign object blocking member 50; however, a configuration may be adopted in which the fragile portions 57 are provided between the protrusions 55 and the rear end portion 58 using a different method from the method described above. For example, the thickness of a portion between the protrusions 55 and the rear end portion 58 of the blocking wall portions 52 of the foreign object blocking member 50 may be rendered less than that of the other portions. In this case, it is possible to cause the thin portion to function as the fragile portions 57.

The fragile portions 57 may not be provided between the protrusions 55 and the rear end portion 58 of the foreign object blocking member 50 in the vehicle front-rear direction X. Even in this case, when the foreign object blocking member 50 is attached to the lower rail 20, the part of the foreign object blocking member 50 between the protrusions 55 and the rear end portion 58 is elastically deformed, and the claw portions 601, 611, and 621 of the protruding portions 60 to 62 are pressed against the bottom surface 213 of the base portion 21 of the lower rail 20.

If the foreign object blocking member 50 is elastically deformed such that the rear end portion 58 is displaced downward when the foreign object blocking member 50 is attached to the lower rail 20, the protrusions 55 may not be provided on the foreign object blocking member 50. Even in this case, it is possible to cause the claw portions 601, 611, and 621 of the protruding portions 60 to 62 to be pressed against the bottom surface 213 of the base portion 21 of the lower rail 20 due to the restorative force of the foreign object blocking member 50.

In the embodiment, the release handle 11 is configured to protrude to the vehicle front from the front end of the upper rail 30. However, in a case in which the release handle 11 is configured to protrude from a different part from the front end of the upper rail 30, the foreign object blocking member 50 may be provided on the vehicle front portion of the lower rail 20 instead of the vehicle rear portion of the lower rail 20. In this case, the foreign object blocking member 50 is attached to the base portion 21 of the lower rail 20 such that the protruding portions 60 to 62 are positioned closer to the vehicle front than the attaching portion 53.

A vehicle seat slide device according to an aspect of this disclosure includes a lower rail which includes a base portion which is fixed to a vehicle body and a pair of wall portions which are connected to both ends of the base portion in a width direction, an upper rail which supports a seat and is supported by the lower rail in a state of being capable of sliding in an extending direction of the lower rail, and a foreign object blocking member which is disposed inside the lower rail and is attached to the base portion, in which a first through hole and a second through hole which is disposed closer to an outside in the extending direction than the first through hole are provided in positions at which the foreign object blocking member is attached in the base portion of the lower rail, in which the foreign object blocking member includes an attaching portion which is disposed to pass through the first through hole and to be lower than the base portion, and a protruding portion which protrudes downward from an outside end portion which is an end portion of an outside in the extending direction, passes through the second through hole of the base portion, and a claw portion provided on a tip of the protruding portion is pressed against a bottom surface of the base portion, and in which the foreign object blocking member is elastically deformed such that the outside end portion is displaced downward in a state in which the foreign object blocking member is attached to the lower rail.

According to this configuration, when attaching the foreign object blocking member to the lower rail, the attaching portion is inserted through the first through hole of the base portion of the lower rail, is hooked onto the base portion, and in this state, the protruding portion is caused to penetrate the second through hole of the base portion. At this time, the foreign object blocking member is elastically deformed such that the outside end portion which is provided with the protruding portion is displaced downward. Therefore, in the state in which the foreign object blocking member is attached to the lower rail, the claw portion of the protruding portion is pressed against the bottom surface of the base portion of the lower rail by the restorative force of the foreign object blocking member. At this time, the attaching portion of the foreign object blocking member has a tendency to be displaced upward by the restorative force from the foreign object blocking member. Therefore, the attaching portion is pushed into the bottom surface of the base portion of the lower rail. Accordingly, it is possible to suppress the wobbling of the foreign object blocking member which is attached to the lower rail.

In the vehicle seat slide device, it is preferable that a protrusion which protrudes downward is provided between the attaching portion and the outside end portion in the foreign object blocking member, and a tip of the protrusion is positioned higher than the tip of the protruding portion and abuts against the base portion of the lower rail.

According to this configuration, in the state in which the foreign object blocking member is attached to the lower rail, a part which is closer to the outside end portion side than the protrusion in the foreign object blocking member is elastically deformed. By allowing the part close to the outside end portion in the extending direction to elastically deform, it is possible to increase the force with which the claw portion of the protruding portion is pushed into the bottom surface of the base portion of the lower rail. When the foreign object blocking member is allowed to elastically deform such that the outside end portion is displaced downward, the foreign object blocking member has a tendency to rotate using the tip of the protruding portion as a fulcrum. As a result, it is possible to push the attaching portion of the foreign object blocking member into the bottom surface of the base portion.

In the vehicle seat slide device, it is preferable that a fragile portion which has a lower rigidity than other parts is provided between the protrusion and the outside end portion in the foreign object blocking member.

According to this configuration, the elastic deformation of the foreign object blocking member is facilitated by providing the fragile portion in the foreign object blocking member.

In the vehicle seat slide device, it is preferable that the protruding portion includes an outside protruding portion which the claw portion is pressed against on a part closer to the outside in the extending direction than the second through hole in the bottom surface of the base portion of the lower rail, and a displacement restriction portion which has a higher rigidity than the outside protruding portion and abuts against a part of an inside in the extending direction in a circumferential surface which surrounds the second through hole is provided on the outside end portion of the foreign object blocking member.

According to this configuration, the displacement restriction portion which is provided on the outside end portion of the foreign object blocking member abuts against a part of the inside in the extending direction in the circumferential surface which surrounds the second through hole. Therefore, even if an external force is applied toward the inside from the outside in the extending direction to the outside end portion of the foreign object blocking member, the displacement of the outside end portion toward the inside in the extending direction is suppressed by the difficulty of elastically deforming the displacement restriction portion. As a result, it becomes difficult to release the locking between the claw portion of the outside protruding portion and the lower rail. In other words, even if the external force described above is applied to the outside end portion of the foreign object blocking member, it is possible to maintain the state in which the foreign object blocking member is attached to the lower rail.

In the vehicle seat slide device, it is preferable that the protruding portion includes a first lateral protruding portion against which the claw portion is pressed at a part closer to one side in the width direction than the second through hole in the bottom surface of the base portion of the lower rail, and a second lateral protruding portion against which the claw portion is pressed at a part closer to another side in the width direction than the second through hole in the bottom surface.

According to this configuration, even if an external force from the outside toward the inside in the extending direction is applied to the outside end portion of the foreign object blocking member, and the locking between the claw portion of the outside protruding portion and the lower rail is released, the locking between the claw portion of both of the lateral protruding portions and the lower rail is maintained. Therefore, it is possible to maintain the state in which the foreign object blocking member is attached to the lower rail.

In the vehicle seat slide device, it is preferable that the protruding portion includes a first lateral protruding portion against which the claw portion is pressed at a part closer to one side in the width direction than the second through hole in the bottom surface of the base portion of the lower rail, and a second lateral protruding portion against which the claw portion is pressed at a part closer to another side in the width direction than the second through hole in the bottom surface, and a length of the outside end portion in the width direction is greater than the length in the width direction of other portions in the foreign object blocking member.

A gap is formed between the wall portions of the lower rail and the outside end portion of the foreign object blocking member. When a foreign object enters the gap and an external force toward the inside in the width direction is applied to the lateral protruding portions from the foreign object, there is a concern that the lateral protruding portions elastically deform inwardly in the width direction and the locking between the claw portion of the lateral protruding portions and the lower rail will be released. To deal with this point, in this configuration, it becomes difficult for the foreign object to enter the gap due to the narrowing of the gap between the wall portions of the lower rail and the outside end portion of the foreign object blocking member. Therefore, it is possible to ensure that it is difficult to release the locking between the claw portion of the lateral protruding portions and the lower rail.

In the vehicle seat slide device, it is preferable that inclined surfaces which incline to be positioned further outside in the width direction the closer to the bottom are provided on both sides of the outside end portion in the width direction.

According to this configuration, even if a foreign object enters the space between the wall portions of the lower rail and the outside end portion of the foreign object blocking member, the foreign object contacts the inclined surfaces of the outside end portion. Therefore, even if an external force is applied to the inclined surfaces of the outside end portion from the foreign object, an event in which the lateral protruding portions elastically deform inwardly in the width direction due to the external force does not occur easily. Therefore, it is possible to ensure that it is difficult to release the locking between the claw portion of the lateral protruding portions and the lower rail.

According to the vehicle seat slide device described above, it is possible to suppress the generation of abnormal noise by suppressing wobbling of the foreign object blocking member in relation to the lower rail.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat slide device of a vehicle, comprising:
    a lower rail which includes a base portion which is fixed to a vehicle body and a pair of wall portions which are connected to both ends of the base portion in a width direction of the vehicle seat slide device;
    an upper rail which supports a seat and is supported by the lower rail in a state of sliding in an extending direction of the lower rail; and
    a foreign object blocking member which is disposed inside the lower rail and is attached to the base portion,
    wherein a first through hole and a second through hole which is disposed closer to an outside in the extending direction than the first through hole are provided in positions at which the foreign object blocking member is attached in the base portion of the lower rail,
    wherein the foreign object blocking member includes an attaching portion which is disposed to pass through the first through hole and to be lower than the base portion, and a protruding portion, which protrudes downward from an outside end portion of the foreign object blocking member, passes through the second through hole of the base portion, and a claw portion provided on a tip of the protruding portion is pressed against a bottom surface of the base portion, and
    wherein the foreign object blocking member is elastically deformed such that the outside end portion is displaced downward in a state in which the foreign object blocking member is attached to the lower rail.

2. The vehicle seat slide device according to claim 1,
    wherein a protrusion which protrudes downward is provided between the attaching portion and the outside end portion in the foreign object blocking member, and
    wherein a tip of the protrusion is positioned higher than the tip of the protruding portion and abuts against the base portion of the lower rail.

3. The vehicle seat slide device according to claim 2,
    wherein a fragile portion which has a lower rigidity than other parts is provided between the protrusion and the outside end portion in the foreign object blocking member.

4. The vehicle seat slide device according to claim 1,
    wherein the protruding portion includes an outside protruding portion which the claw portion is pressed against on a part closer to the outside in the extending direction than the second through hole in the bottom surface of the base portion of the lower rail, and
    wherein a displacement restriction portion which has a higher rigidity than the outside protruding portion and abuts against a part of an inside in the extending direction in a circumferential surface which surrounds the second through hole is provided on the outside end portion of the foreign object blocking member.

5. The vehicle seat slide device according to claim 4,
    wherein the protruding portion includes
        a first lateral protruding portion against which the claw portion is pressed at a part closer to one side in the width direction than the second through hole in the bottom surface of the base portion of the lower rail, and
        a second lateral protruding portion against which the claw portion is pressed at a part closer to another side in the width direction than the second through hole in the bottom surface.

6. The vehicle seat slide device according to claim 1,
    wherein the protruding portion includes
        a first lateral protruding portion against which the claw portion is pressed at a part closer to one side in the width direction than the second through hole in the bottom surface of the base portion of the lower rail, and
        a second lateral protruding portion against which the claw portion is pressed at a part closer to another side in the width direction than the second through hole in the bottom surface, and
    wherein a length of the outside end portion in the width direction is greater than the length in the width direction of other portions in the foreign object blocking member.

7. The vehicle seat slide device according to claim 5,
    wherein inclined surfaces which incline to be positioned further outside in the width direction the closer to the bottom are provided on both sides of the outside end portion in the width direction.

* * * * *